United States Patent
Zhang

(10) Patent No.: US 11,527,914 B2
(45) Date of Patent: Dec. 13, 2022

(54) ELECTRONIC DEVICE, WIRELESS CHARGING DEVICE, AND WIRELESS CHARGING METHOD

(71) Applicant: VIVO MOBILE COMMUNICATION CO., LTD., Guangdong (CN)

(72) Inventor: Jun Zhang, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

(21) Appl. No.: 17/144,005

(22) Filed: Jan. 7, 2021

(65) Prior Publication Data

US 2021/0135494 A1 May 6, 2021

Related U.S. Application Data

(63) Continuation of application No. PCT/CN2019/094482, filed on Jul. 3, 2019.

(30) Foreign Application Priority Data

Jul. 10, 2018 (CN) .......................... 201810752195.3

(51) Int. Cl.
*H02J 50/10* (2016.01)
*H02J 50/00* (2016.01)

(52) U.S. Cl.
CPC ............ *H02J 50/10* (2016.02); *H02J 50/005* (2020.01)

(58) Field of Classification Search
CPC . H02J 5/005; H02J 7/025; H02J 17/00; H01F 38/14; B60L 11/182
USPC .......................................................... 307/104
See application file for complete search history.

(56) References Cited

U.S. PATENT DOCUMENTS

| 10,312,739 B2* | 6/2019 | Nakahara ................. H03H 7/40 |
| 2011/0115433 A1 | 5/2011 | Lee et al. |
| 2012/0169279 A1 | 7/2012 | Kim |
| 2013/0181535 A1* | 7/2013 | Muratov ................. H02J 50/10 307/104 |
| 2013/0181724 A1 | 7/2013 | Teggatz et al. |

(Continued)

FOREIGN PATENT DOCUMENTS

| CN | 102544615 A | 7/2012 |
| CN | 103036282 A | 4/2013 |

(Continued)

OTHER PUBLICATIONS

EP Search Report in Application No. 19834687.6 dated May 25, 2021.

(Continued)

*Primary Examiner* — Quan Tra
*Assistant Examiner* — Anh-Quan Tra
(74) *Attorney, Agent, or Firm* — Maschoff Brennan

(57) ABSTRACT

An electronic device, a wireless charging device and a wireless charging method, which belong to the technical field of charging. The electronic device comprises: a receiving coil, a receiving circuit, a first switch module and a first control module, wherein the first control module is used for controlling, according to a related parameter for the magnetic coupling strength between the receiving coil and a transmitting coil of a wireless charging device, the turning on and off of at least two first switches in the first switch module, so as to adjust the number of turns of subcoils in the receiving coil that effectively work.

15 Claims, 9 Drawing Sheets

(56) References Cited

U.S. PATENT DOCUMENTS

| | | | |
|---|---|---|---|
| 2015/0035372 A1* | 2/2015 | Aioanei | H02J 50/60 307/104 |
| 2016/0094082 A1* | 3/2016 | Ookawa | H01F 38/14 320/108 |
| 2016/0257209 A1 | 9/2016 | Lewis | |
| 2017/0201114 A1* | 7/2017 | Chang | H02J 7/0042 |
| 2018/0287427 A1* | 10/2018 | Oshima | H02J 50/80 |
| 2021/0066952 A1* | 3/2021 | Chen | H02J 7/00032 |
| 2021/0135494 A1 | 5/2021 | Zhang | |

FOREIGN PATENT DOCUMENTS

| | | |
|---|---|---|
| CN | 105826066 A | 8/2016 |
| CN | 106130196 A | 11/2016 |
| CN | 108923545 A | 11/2018 |
| EP | 2 696 467 A1 | 2/2014 |
| EP | 3 038 232 A1 | 6/2016 |

OTHER PUBLICATIONS

Written Opinion and International Search Report in Application No. PCT/CN2019/094482 dated Jan. 21, 2021.

* cited by examiner

ELECTRONIC DEVICE, WIRELESS CHARGING DEVICE, AND WIRELESS CHARGING METHOD

CROSS REFERENCE TO RELATED APPLICATIONS

This application is a continuation application of International Application No. PCT/CN2019/094482 filed on Jul. 3, 2019, which claims priority to Chinese Patent Application No. 201810752195.3 filed in China on Jul. 10, 2018, which is incorporated herein by reference in its entirety.

TECHNICAL FIELD

Embodiments of the present disclosure relate to the field of charging technologies, and in particular, to an electronic device, a wireless charging device, and a wireless charging method.

BACKGROUND

With the development of wireless charging technologies, the wireless charging function is increasingly widely applied to terminal devices. Currently, one of the most prominent trends of wireless charging technologies applied to intelligent terminal devices is to increase charging power, that is, the wireless fast charging technology. This technology can shorten a charging time of terminal devices, thereby improving charging experience of users.

However, because temperature rises of terminal devices cannot be tackled, development of the wireless fast charging technology is currently limited. Temperature rises in a charging process are predominantly caused by coils. To implement wireless charging, a coil with a very large number of turns needs to be designed. However, as the number of turns of the coil is larger, that is, the coil is longer, the impedance of the coil is larger. As the impedance is larger, the coil consumes more energy and consequently generates more heat.

SUMMARY

Embodiments of the present disclosure provide an electronic device, a wireless charging device, and a wireless charging method, to tackle temperature rises of devices in a wireless charging process in the related art.

To resolve the foregoing technical problem, the present disclosure is implemented as follows:

According to a first aspect, an embodiment of the present disclosure provides an electronic device, including:

a receiving coil, a receiving circuit, a first switch module, and a first control module, where the receiving circuit includes two access ends;

the receiving coil includes at least two turns of sub-coils, the receiving coil includes two lead ends, and one lead end of the receiving coil is connected to one access end of the receiving circuit;

the first switch module includes at least two first switches, a control end of each first switch is connected to the first control module, a first end of the first switch is connected to one turn of sub-coil of the receiving coil, and a second end of the first switch is connected to the other access end of the receiving circuit; and the first control module is configured to control turn-on or turn-off of the at least two first switches of the first switch module according to a parameter related to strength of magnetic coupling between the receiving coil and a transmitting coil of a wireless charging device, to adjust the number of turns of sub-coils that work effectively in the receiving coil.

According to a second aspect, an embodiment of the present disclosure further provides a wireless charging device, including:

a transmitting coil, a transmitting circuit, a second switch module, and a second control module, where the transmitting circuit includes two access ends;

the transmitting coil includes at least two turns of sub-coils, the transmitting coil includes two lead ends, and one lead end of the transmitting coil is connected to one access end of the transmitting circuit;

the second switch module includes at least two second switches, a control end of each second switch is connected to the second control module, a first end of the second switch is connected to one turn of sub-coil of the transmitting coil, and a second end of the second switch is connected to the other access end of the transmitting circuit; and the second control module is configured to control turn-on or turn-off of the at least two second switches of the second switch module according to a parameter related to strength of magnetic coupling between the transmitting coil and a receiving coil of an electronic device, to adjust the number of turns of sub-coils that work effectively in the transmitting coil.

According to a third aspect, an embodiment of the present disclosure further provides a wireless charging method, operable by any one of the foregoing electronic devices, and including:

obtaining a parameter related to strength of magnetic coupling between a receiving coil and a transmitting coil of a wireless charging device; and controlling turn-on or turn-off of at least two first switches of a first switch module according to the parameter related to strength of magnetic coupling, to adjust the number of turns of sub-coils that work effectively in the receiving coil.

According to a fourth aspect, an embodiment of the present disclosure further provides a wireless charging method, operable by any one of the foregoing wireless charging devices, and including:

obtaining a parameter related to strength of magnetic coupling between a transmitting coil and a receiving coil of an electronic device; and controlling turn-on or turn-off of at least two second switches of a second switch module according to the parameter related to strength of magnetic coupling, to adjust the number of turns of sub-coils that work effectively in the transmitting coil.

According to a fifth aspect, an embodiment of the present disclosure further provides an electronic device, including:

a first obtaining module, configured to obtain a parameter related to strength of magnetic coupling between a receiving coil and a transmitting coil of a wireless charging device; and a first adjustment module, configured to control turn-on or turn-off of at least two first switches of a first switch module according to the parameter related to strength of magnetic coupling, to adjust the number of turns of sub-coils that work effectively in the receiving coil.

According to a sixth aspect, an embodiment of the present disclosure further provides a wireless charging device, including:

a second obtaining module, configured to obtain a parameter related to strength of magnetic coupling between a transmitting coil and a receiving coil of an electronic device; and a second adjustment module, configured to control turn-on or turn-off of at least two second switches of a second switch module according to the parameter related to strength of magnetic coupling, to adjust the number of turns of sub-coils that work effectively in the transmitting coil.

According to a seventh aspect, an embodiment of the present disclosure further provides an electronic device, including: a processor, a memory, and a computer program stored in the memory and executable on the processor. When the computer program is executed by the processor, the steps of any one of the foregoing wireless charging methods operable by the electronic device are performed.

According to an eighth aspect, an embodiment of the present disclosure further provides a wireless charging device, including: a processor, a memory, and a computer program stored in the memory and executable on the processor. When the computer program is executed by the processor, the steps of any one of the foregoing wireless charging methods operable by the wireless charging device are performed.

According to a ninth aspect, an embodiment of the present disclosure further provides a computer-readable storage medium, where the computer-readable storage medium stores a computer program. When the computer program is executed by a processor, the steps of any one of the foregoing wireless charging methods are performed.

In the embodiments of the present disclosure, the number of turns of sub-coils that work effectively in the receiving coil is adjusted, and/or the number of turns of sub-coils that work effectively in the transmitting coil is adjusted, to adjust the impedance of the receiving coil and/or the transmitting coil. Therefore, this reduces a temperature rise of a corresponding device during charging while ensuring charging efficiency (fast charging), and can also reduce charging loss.

BRIEF DESCRIPTION OF DRAWINGS

To describe the technical solutions in the embodiments of the present disclosure more clearly, the following briefly describes the accompanying drawings required in descriptions of the embodiments of the present disclosure. Apparently, the accompanying drawings in the following descriptions show merely some embodiments of the present disclosure, and a person of ordinary skill in the art can still derive other accompanying drawings from these accompanying drawings without creative efforts.

FIG. 3b is a schematic rear diagram of the receiving coil in FIG. 3a;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the described embodiments of the present disclosure shall fall within the protection scope of the present disclosure.

Figure 1:
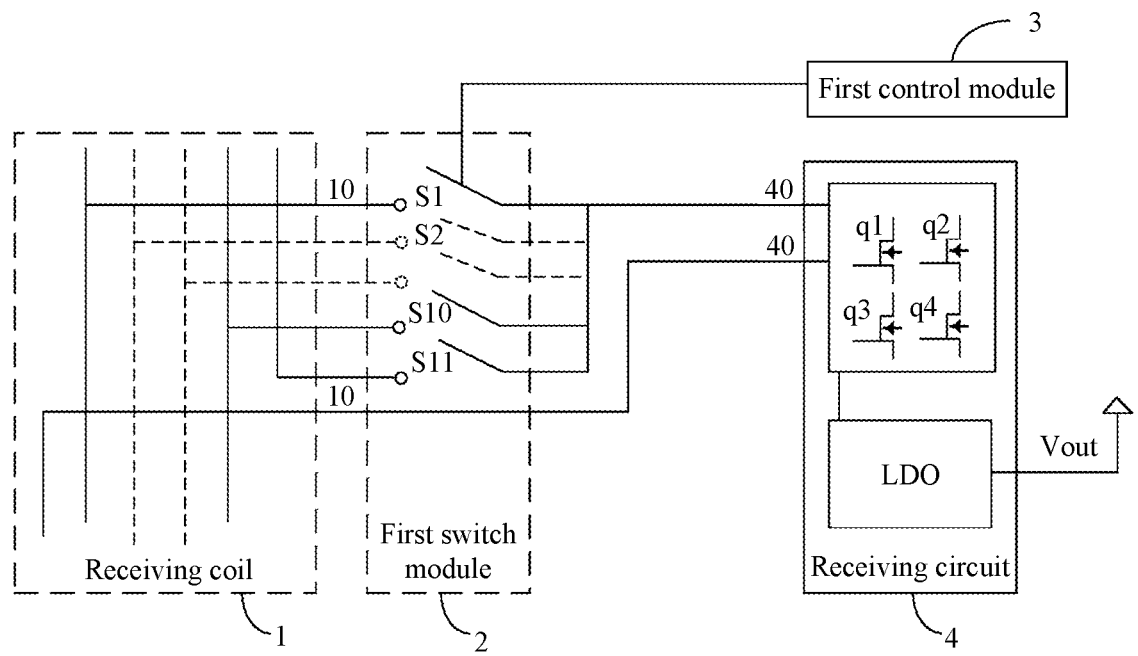
FIG. 1 is a schematic diagram of a circuit structure of an electronic device according to a first embodiment of the present disclosure.

FIG. 1 is a schematic diagram of a circuit structure of an electronic device according to a first embodiment of the present disclosure. The electronic device includes:

a receiving coil 1, a receiving circuit 4, a first switch module 2, and a first control module 3, where the receiving circuit 4 includes two access ends 40;

the receiving coil 1 includes at least two turns of sub-coils, the receiving coil 1 includes two lead ends 10, and one lead end 10 of the receiving coil 1 is connected to one access end 40 of the receiving circuit 4;

the first switch module 2 includes at least two first switches, a control end of each first switch is connected to the first control module 3 (FIG. 1 shows only the control end of the first switch S1 and the first control module 3), a first end of the first switch is connected to one turn of sub-coil (in FIG. 1, each turn of sub-coil in the receiving coil 1 is equivalent to a line) of the receiving coil 1, and a second end of the first switch is connected to the other access end 40 of the receiving circuit 4; and the first control module 3 is configured to control turn-on or turn-off of the at least two first switches of the first switch module 2 according to a parameter related to strength of magnetic coupling between the receiving coil 1 and a transmitting coil of a wireless charging device, to adjust the number of turns of sub-coils that work effectively in the receiving coil 1.

In the electronic device provided in the embodiments of the present disclosure, turn-on or turn-off of the at least two first switches of the first switch module 2 is controlled according to the parameter related to strength of magnetic coupling between the receiving coil 1 and the transmitting coil of the wireless charging device, to adjust the number of turns of sub-coils that work effectively in the receiving coil 1, thereby adjusting the effective impedance of the receiving coil 1 (as the coil has a larger number of turns, the coil is longer and also has a larger impedance). Therefore, this reduces a temperature rise of the electronic device during charging while ensuring charging efficiency (a charging speed), and can also reduce charging loss.

The following describes an example of a specific structure of the electronic device.

Figure 2:
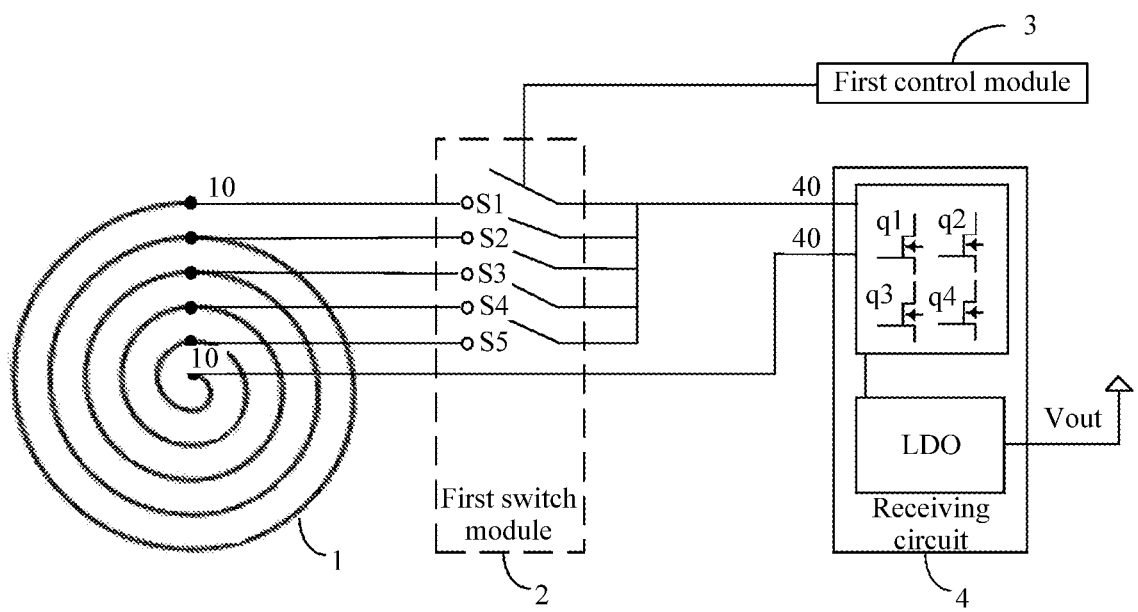
FIG. 2 is a schematic diagram of another circuit structure of an electronic device according to a first embodiment of the present disclosure.

Referring to FIG. 2, in this embodiment, one end of each first switch of the first switch module 2 is connected to one turn of sub-coil in the receiving coil 1 by using a feedpoint terminal (led out from the sub-coil of the receiving coil 1), another end of the first switch is connected to one access end 40 of the receiving circuit 4, and the other access end 40 of the receiving circuit 4 is connected to one lead end 10 of the receiving coil 1. When the other access end 40 of the receiving circuit 4 is connected to the inner lead end close to the center on the receiving coil 1, the outer lead end away from the center on the receiving coil 1 serves as a feedpoint terminal of the fifth turn of sub-coil (turns of sub-coils are numbered from inside to outside). The receiving circuit 4 may include a receiving chip, a rectifier circuit, an energy storage battery, and the like. The receiving chip may be configured to perform other computing processing and control required in a wireless charging process, and may be further configured to perform computing processing and control required when the electronic device runs.

Specifically, the receiving coil 1 shown in FIG. 2 has five turns of sub-coils, and the first switch module 2 correspondingly has five first switches. If the first control module 3 controls the first switch S1 to turn on and controls other first switches to turn off, five turns of sub-coils actually work in the receiving coil 1. If the first control module 3 controls the first switch S2 to turn on and controls other first switches to turn off, four turns of sub-coils actually work in the receiving coil 1. If the first control module 3 controls the first switch S5 to turn on and controls other first switches to turn off, only one turn of sub-coil actually works in the receiving coil 1. Therefore, the first control module 3 may adjust the number of turns of effective sub-coils in the receiving coil 1 according to a requirement. As a smaller number of turns of sub-coils work effectively in the receiving coil 1, the receiving coil 1 has a smaller impedance. A smaller impedance indicates less loss and less heat. Therefore, the number of turns of sub-coils that work effectively in the receiving coil 1 can be reduced to reduce a temperature rise in a charging process while charging efficiency (a charging speed) of the electronic device is ensured.

In another implementation, the first switch module 2 and/or the first control module 3 may be integrated into the receiving chip of the receiving circuit 4, to increase a circuit integration degree.

Figure 3A:
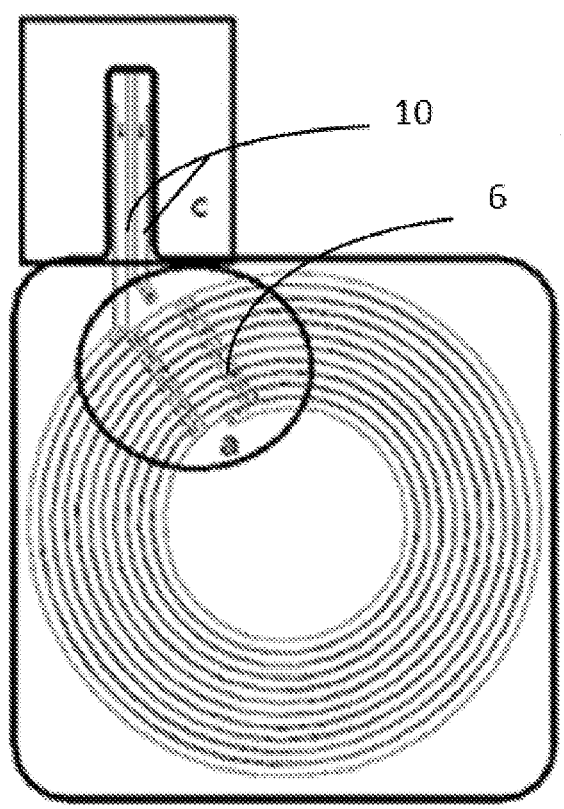
FIG. 3a is a schematic front diagram of a receiving coil according to a first embodiment of the present disclosure.
Figure 3B:
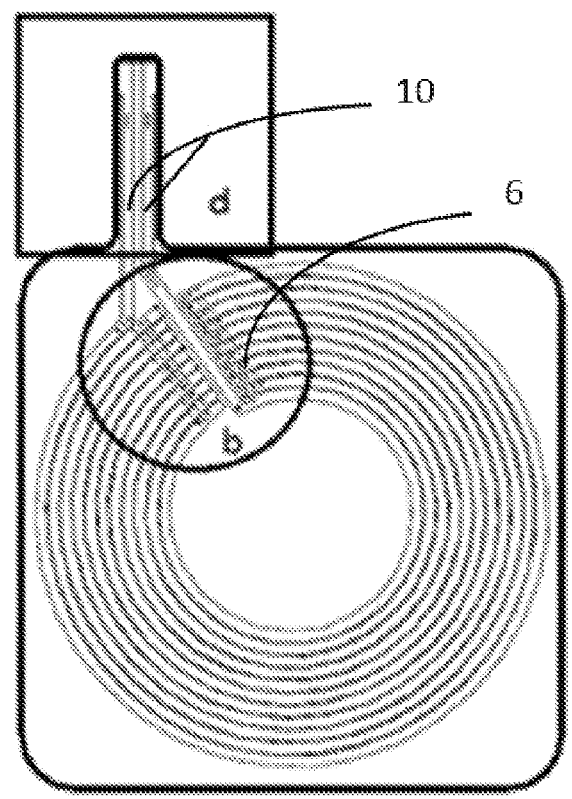

Optionally, the receiving coil 1 may be specifically a spiral coil, and includes a front coil and a rear coil. The number of turns of sub-coils in the front coil is the same as that in the rear coil, and each turn of sub-coil in the front coil is connected in parallel with a corresponding turn of sub-coil in the rear coil. Referring to FIG. 3*a* and FIG. 3*b*, FIG. 3*a* is a schematic front diagram of a spiral coil, and FIG. 3*b* is a schematic rear diagram of the spiral coil. The spiral coil includes two lead ends 10. Each turn of sub-coil in the front coil is connected to a corresponding turn of sub-coil in the rear coil by using an electrical connection hole 6. That is, the first turn of sub-coil in the front coil is connected in parallel with the first turn of sub-coil in the rear coil, the second turn of sub-coil in the front coil is connected in parallel with the second turn of sub-coil in the rear coil, and the like. The sub-coil in the front coil and the sub-coil in the rear coil that are connected in parallel may offload a charging current from the receiving coil 1 and reduce an overall impedance of the receiving coil 1, thereby further reducing a temperature rise of the electronic device during charging.

The parameter related to strength of magnetic coupling includes at least one of the following: a coefficient of coupling between the receiving coil and the transmitting coil, a mutual inductance of the receiving coil and the transmitting coil, relative positions of the receiving coil and the transmitting coil, an induced electromotive force of the receiving coil, transmission power, and transmission gains. That is, one or more of these parameters may be used to indicate the strength of magnetic coupling between the receiving coil and the transmitting coil.

Specifically, the mutual inductance of the receiving coil and the transmitting coil is $\omega = k\sqrt{(Lp*Ls)}$, where k is the coefficient of coupling between the receiving coil and the transmitting coil, Lp is an inductance of the transmitting coil, and Ls is an inductance of the receiving coil. The strength of magnetic coupling between the receiving coil and the transmitting coil is positively correlated with the mutual inductance of the receiving coil and the transmitting coil. The coefficient of coupling between the receiving coil and the transmitting coil is related to the relative positions of the transmitting coil and the receiving coil. When centers of the transmitting coil and the receiving coil are aligned, the coefficient of coupling between the receiving coil and the transmitting coil is the largest, the mutual inductance of the receiving coil and the transmitting coil is the largest, the magnetic flux passing through coils is the largest, the induced electromotive force generated in the receiving coil is the strongest, and the transmission power is also the highest.

Figure 4:
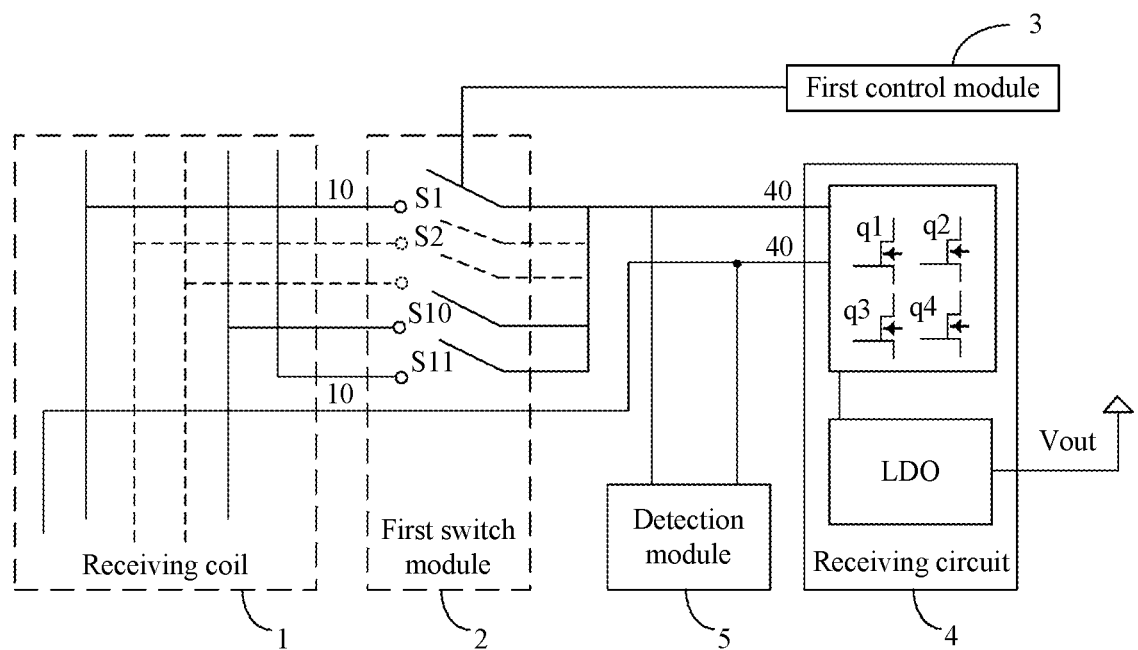
FIG. 4 is a schematic diagram of a circuit structure of a second electronic device according to a first embodiment of the present disclosure.

In this embodiment of the present disclosure, referring to FIG. 4, the electronic device further includes a detection module 5, configured to detect the parameter related to strength of magnetic coupling between the receiving coil and the transmitting coil of the wireless charging device, for example, configured to detect the relative positions of the receiving coil and the transmitting coil, the coefficient of coupling between the receiving coil and the transmitting coil, the induced electromotive force of the receiving coil, the transmission power, and the mutual inductance of the receiving coil and the transmitting coil.

In an implementation, the detection module 5 includes: a detection unit and at least one pair of auxiliary coils disposed orthogonally in the receiving coil 1. The detection unit is configured to detect induced electromotive forces of the auxiliary coils, and obtain relative positions of the receiving coil and the transmitting coil according to the induced electromotive forces.

In another optional implementation, the electronic device further includes a communications module, configured to communicate with the wireless charging device and receive a related parameter of the transmitting coil of the wireless charging device, to obtain the parameter related to strength of magnetic coupling between the receiving coil and the transmitting coil of the wireless charging device, for example, configured to obtain an inductance of the transmitting coil.

A second embodiment of the present disclosure provides a wireless charging device. The wireless charging device includes:

a transmitting coil, a transmitting circuit, a second switch module, and a second control module, where the transmitting circuit includes two access ends;

the transmitting coil includes at least two turns of sub-coils, the transmitting coil includes two lead ends, and one lead end of the transmitting coil is connected to one access end of the transmitting circuit;

the second switch module includes at least two second switches, a control end of each second switch is connected to the second control module, a first end of the second switch is connected to one turn of sub-coil of the transmitting coil, and a second end of the second switch is connected to the other access end of the transmitting circuit; and the second control module is configured to control turn-on or turn-off of the at least two second switches of the second switch module according to a parameter related to strength of magnetic coupling between the transmitting coil and a receiving coil of an electronic device, to adjust the number of turns of sub-coils that work effectively in the transmitting coil.

In this embodiment of the present disclosure, the second control module of the wireless charging device may control turn-on or turn-off of the at least two second switches of the second switch module according to the parameter related to strength of magnetic coupling between the transmitting coil of the wireless charging device and a receiving coil of an electronic device, to adjust the number of turns of sub-coils that work effectively in the transmitting coil, thereby adjusting the effective impedance of the transmitting coil. Therefore, this reduces a temperature rise of the wireless charging device during charging while ensuring charging efficiency (a charging speed), and can also reduce charging loss.

The following describes an example of a specific structure of the wireless charging device.

In this embodiment of the present disclosure, the transmitting coil specifically includes a front coil and a rear coil, the number of turns of sub-coils in the front coil is the same as that in the rear coil, and each turn of sub-coil in the front coil is connected in parallel with a corresponding turn of sub-coil in the rear coil. The same spiral coil as the receiving coil of the electronic device shown in FIG. 3a and FIG. 3b may be used as the transmitting coil. Therefore, for a specific structure and beneficial effects of the transmitting coil, refer to the foregoing first embodiment. Details are not described herein again.

The transmitting circuit may include a power source, a transmitting chip, and another peripheral circuit. The transmitting chip is mainly configured to perform other computing processing and control required in a charging process of the wireless charging device.

The wireless charging device in this embodiment is proposed based on the same invention idea as the electronic device in the foregoing first embodiment. For specific structures other than the transmitting circuit, principles, and beneficial effects, refer to specific content in the foregoing first embodiment. Details are not described herein again.

Figure 5:
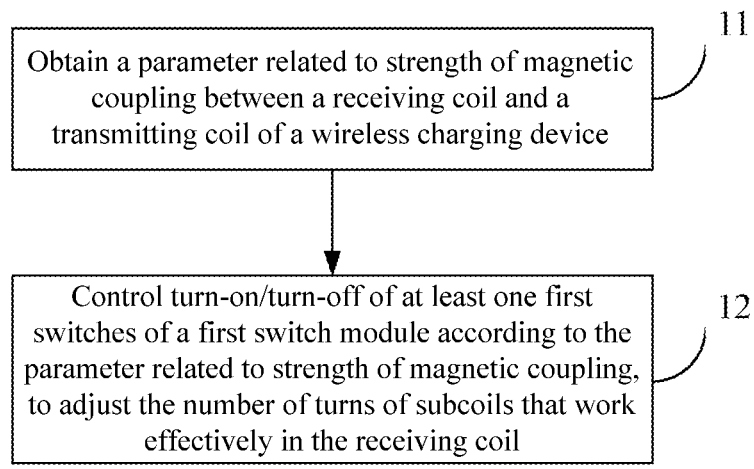
FIG. 5 is a schematic flowchart of a wireless charging method according to a third embodiment of the present disclosure.

FIG. 5 is a schematic flowchart of a wireless charging method according to a third embodiment of the present disclosure. The wireless charging method may be operable by the electronic device in the foregoing first embodiment. The method includes:

Step 11: Obtain a parameter related to strength of magnetic coupling between a receiving coil and a transmitting coil of a wireless charging device.

Step 12: Control turn-on or turn-off of at least two first switches of a first switch module according to the parameter related to strength of magnetic coupling, to adjust the number of turns of sub-coils that work effectively in the receiving coil.

In this embodiment of the present disclosure, turn-on or turn-off of the at least two first switches of the first switch module is controlled according to the parameter related to strength of magnetic coupling between the receiving coil of the electronic device and the transmitting coil of the wireless charging device, to adjust the number of turns of sub-coils that work effectively in the receiving coil, thereby adjusting the effective impedance of the receiving coil. Therefore, this reduces a temperature rise of the electronic device during charging while ensuring charging efficiency (a charging speed), and can also reduce charging loss.

The following describes an example of a specific process of the wireless charging method.

In a specific implementation, step 12, that is, the step of controlling turn-on or turn-off of at least two first switches of a first switch module according to the parameter related to strength of magnetic coupling, to adjust the number of turns of sub-coils that work effectively in the receiving coil includes:

Step 121: When the parameter related to strength of magnetic coupling indicates that the receiving coil and the transmitting coil are in a strong coupling state, control turn-on or turn-off of the at least two first switches of the first switch module, to reduce the number of turns of sub-coils that work effectively in the receiving coil.

Step 122: When the parameter related to strength of magnetic coupling indicates that the receiving coil and the transmitting coil are in a weak coupling state, control turn-on or turn-off of the at least two first switches of the first switch module, to increase the number of turns of sub-coils that work effectively in the receiving coil.

In this embodiment, when the receiving coil of the electronic device and the transmitting coil are in a strong coupling state, only some sub-coils in the receiving coil are required to implement fast charging. Therefore, this can reduce the number of turns of sub-coils that work effectively in the receiving coil, thereby reducing impedance loss and a temperature rise in a charging process.

Specifically, the parameter related to strength of magnetic coupling includes at least one of the following:

a coefficient of coupling between the receiving coil and the transmitting coil;

a mutual inductance of the receiving coil and the transmitting coil;

relative positions of the receiving coil and the transmitting coil;

an induced electromotive force of the receiving coil;

transmission power; or transmission gains.

The following describes examples of step 121 and step 122.

Figure 6:
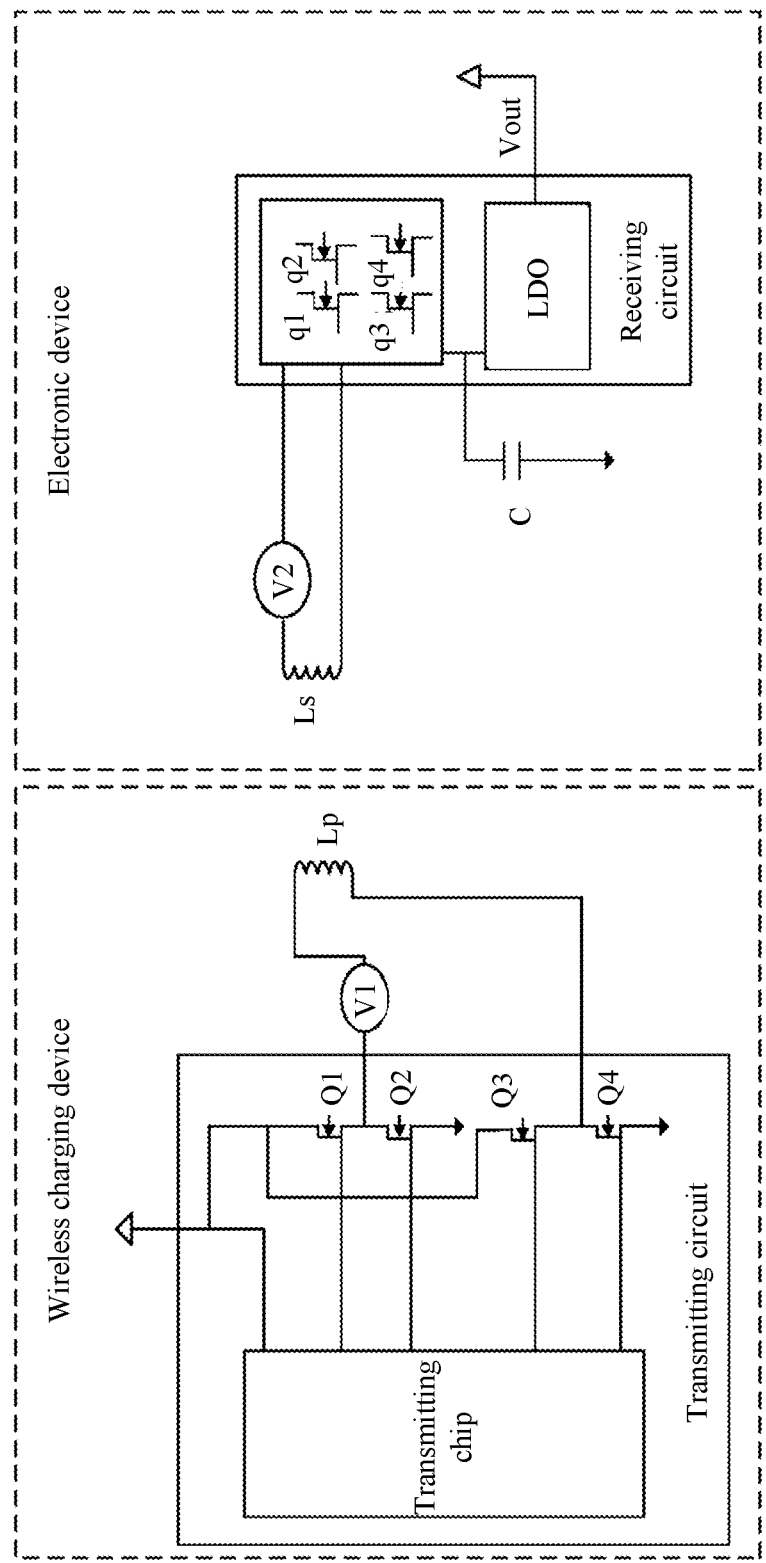
FIG. 6 is a schematic diagram in which a wireless charging device cooperates with an electronic device to wirelessly transmit electricity according to an embodiment of the present disclosure.

FIG. 6 is a schematic diagram in which a wireless charging device cooperates with an electronic device to wirelessly transmit electricity. When the parameter related to strength of magnetic coupling is the transmission gains (or the induced electromotive force of the receiving coil), the transmission gains G are equal to V2/V1. V2 indicates a voltage of the receiving coil of the electronic device (that is, the induced electromotive force of the receiving coil). V1 indicates a voltage of the transmitting coil of the wireless charging device. As the transmitting coil and the receiving coil are coupled more strongly, the voltage V2 of the receiving coil is larger. The voltage V1 of the transmitting coil also keeps unchanged when a power supply voltage is unchanged. Therefore, a threshold voltage V is set in the first control module of the electronic device. When V2 is larger than V, it indicates that the receiving coil and the transmitting coil are in a strong coupling state, and turn-on or turn-off of the at least two first switches of the first switch module is controlled to reduce the number of turns of sub-coils that work effectively in the receiving coil. When V2 is not larger than V, it indicates that the receiving coil and the transmitting coil are in a weak coupling state, and turn-on or turn-off of the at least two first switches of the first switch module is controlled to increase the number of turns of sub-coils that work effectively in the receiving coil. Similarly, when the parameter related to strength of magnetic coupling is the coefficient of coupling between the receiving coil and the transmitting coil, a coupling coefficient threshold may also be preset. When the coefficient of coupling between the receiving coil and the transmitting coil is larger than the preset coupling coefficient, it indicates that the receiving coil and the transmitting coil are in a strong coupling state, and turn-on or turn-off of the at least two first switches of the first switch module is controlled to reduce the number of turns of sub-coils that work effectively in the receiving coil. Otherwise, turn-on or turn-off of the at least two first switches of the first switch module is controlled to increase the number of turns of sub-coils that work effectively in the receiving coil. When the parameter related to strength of magnetic coupling is the mutual inductance of the receiving coil and the transmitting coil, an inductance threshold is preset. When the mutual inductance of the receiving coil and the transmitting coil is larger than the preset inductance threshold, it indicates that the receiving coil and the transmitting coil are in a strong coupling state, and turn-on or turn-off of the at least two first switches of the first switch module is controlled to reduce the number of turns of sub-coils that work effectively in the receiving coil. Otherwise, turn-on or turn-off of the at least two first switches of the first switch module is controlled to increase the number of turns of sub-coils that work effectively in the receiving coil. When the parameter related to strength of magnetic coupling is the relative positions of the receiving coil and the transmitting coil, a distance between the center of the transmitting coil and the center of the receiving coil may be obtained, and a distance threshold may be preset. When the distance between the center of the transmitting coil and the center of the receiving coil is larger than the preset distance threshold, it indicates that the receiving coil and the transmitting coil are in a weak coupling state, and turn-on or turn-off of the at least two first switches of the first switch module is controlled to increase the number of turns of sub-coils that work effectively in the receiving coil. Otherwise, turn-on or turn-off of the at least two first switches of the first switch module is controlled to reduce the number of turns of sub-coils that work effectively in the receiving coil.

Figure 7:
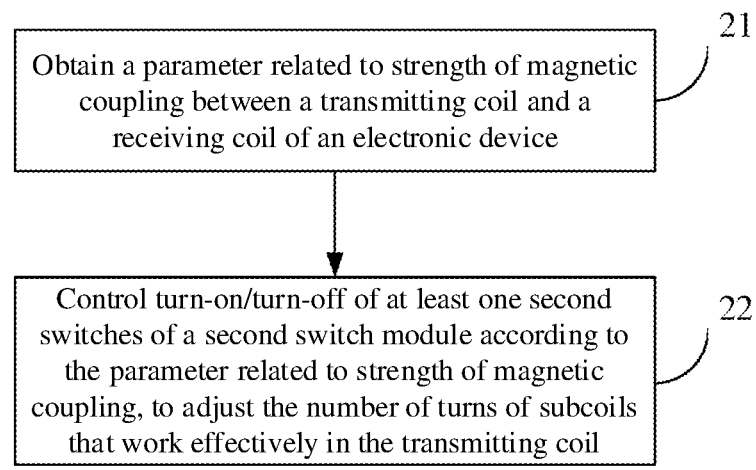
FIG. 7 is a schematic flowchart of a wireless charging method according to a fourth embodiment of the present disclosure.

FIG. 7 is a schematic flowchart of a wireless charging method according to a fourth embodiment of the present disclosure. The wireless charging method may be operable by the wireless charging device in the foregoing second embodiment. The method includes:

Step 21: Obtain a parameter related to strength of magnetic coupling between a transmitting coil and a receiving coil of an electronic device.

Step 22: Control turn-on or turn-off of at least two second switches of a second switch module according to the parameter related to strength of magnetic coupling, to adjust the number of turns of sub-coils that work effectively in the transmitting coil.

In this embodiment of the present disclosure, turn-on or turn-off of the second switches of the second switch module is controlled according to the parameter related to strength of magnetic coupling between the transmitting coil of the wireless charging device and the receiving coil of the electronic device, to adjust the number of turns of sub-coils that work effectively in the transmitting coil, thereby adjusting the effective impedance of the transmitting coil. Therefore, this reduces a temperature rise of the wireless charging device during charging while ensuring charging efficiency (fast charging), and can also reduce charging loss.

The following describes an example of a specific process of the wireless charging method.

In a specific implementation, step 22, that is, the step of controlling turn-on or turn-off of at least two second switches of a second switch module according to the parameter related to strength of magnetic coupling, to adjust the number of turns of sub-coils that work effectively in the transmitting coil includes:

Step 221: When the parameter related to strength of magnetic coupling indicates that the transmitting coil and the receiving coil are in a strong coupling state, control turn-on or turn-off of the at least two second switches of the second switch module, to reduce the number of turns of sub-coils that work effectively in the transmitting coil.

Step 222: When the parameter related to strength of magnetic coupling indicates that the transmitting coil and the receiving coil are in a weak coupling state, control turn-on or turn-off of the at least two second switches of the second switch module, to increase the number of turns of sub-coils that work effectively in the transmitting coil.

Specifically, the parameter related to strength of magnetic coupling includes at least one of the following:

a coefficient of coupling between the receiving coil and the transmitting coil;

a mutual inductance of the receiving coil and the transmitting coil;

relative positions of the receiving coil and the transmitting coil;

an induced electromotive force of the receiving coil;

transmission power; or transmission gains.

The wireless charging method operable by the wireless charging device in this embodiment is proposed based on the same invention idea as the wireless charging method in the foregoing third embodiment. For specific steps, principles, and beneficial effects, refer to specific content in the foregoing third embodiment. Details are not described herein again.

According to the foregoing descriptions of the implementations, a person skilled in the art may clearly understand that the wireless charging methods in the foregoing third embodiment and the foregoing fourth embodiment may be implemented by using software and a necessary universal hardware platform, or certainly may be implemented by using hardware. However, in many cases, the former is a preferred implementation. Based on such an understanding, the technical solutions of the present disclosure essentially or the part contributing to the related art may be implemented in a form of a software product. The computer software product is stored in a storage medium (for example, a ROM/RAM, a magnetic disk, or an optical disc) and includes several instructions for instructing a terminal (which may be a mobile phone, a computer, a server, an air conditioner, a network device, or the like) to execute the methods described in the third embodiment and the fourth embodiment of the present disclosure.

Figure 8:
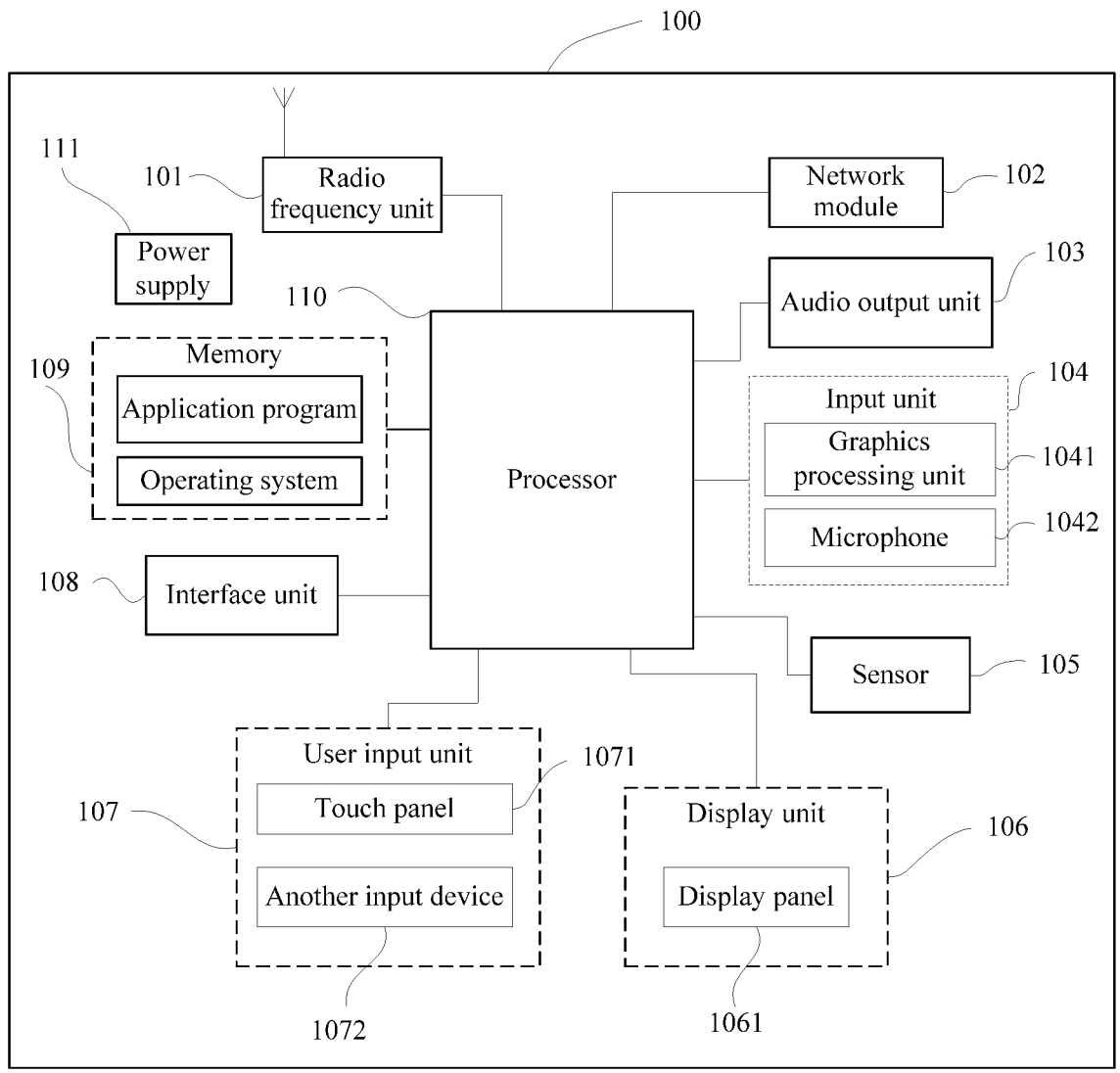
FIG. 8 is a schematic diagram of a hardware structure of an electronic device according to an embodiment of the present disclosure.

FIG. 8 is a schematic diagram of a hardware structure of an electronic device according to an embodiment of the present disclosure. In addition to the receiving coil and the first switch module, the electronic device 100 further includes, but is not limited to: a radio frequency unit 101, a network module 102, an audio output unit 103, an input unit 104, a sensor 105, a display unit 106, a user input unit 107, an interface unit 108, a memory 109, a processor (including the first control module) 110, a power supply 111, and other components. A person skilled in the art may understand that the structure of the electronic device shown in FIG. 8 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The processor (including the first control module) 110 is configured to: obtain a parameter related to strength of magnetic coupling between a receiving coil and a transmitting coil of a wireless charging device; and control turn-on or turn-off of at least two first switches of the first switch module according to the parameter related to strength of magnetic coupling, to adjust the number of turns of sub-coils that work effectively in the receiving coil.

It should be understood that, in this embodiment of the present disclosure, the radio frequency unit 101 may be configured to receive and transmit signals in a process of receiving or transmitting information or calling. Specifically, after receiving downlink data from a base station, the radio frequency unit 101 sends the downlink data to the processor (including the first control module) 110 for processing. In addition, the radio frequency unit 101 sends uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may also communicate with another device through a wireless communications system and network.

The electronic device provides users with wireless broadband Internet access through the network module 102, for example, helps users receive and send e-mails, browse web pages, and access streaming media.

The audio output unit 103 may convert audio data received by the radio frequency unit 101 or the network module 102 or stored in the memory 109 into an audio signal, and output the audio signal as sound. Moreover, the audio output unit 103 may further provide audio output related to a specific function performed the electronic device 100 (for example, call signal receiving sound and message receiving sound). The audio output unit 103 includes a loudspeaker, a buzzer, a telephone receiver, and the like.

The input unit 104 is configured to receive audio or video signals. The input unit 104 may include a graphics processing unit (Graphics Processing Unit, GPU) 1041 and a microphone 1042. The graphics processing unit 1041 processes image data of a static picture or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or another storage medium) or sent by the radio frequency unit 101 or the network module 102. The microphone 1042 may receive sound, and may process such sound into audio data. The processed audio data may be converted, in a telephone calling mode, into a format that may be sent by the radio frequency unit 101 to a mobile communications base station for output.

The electronic device 100 may further include at least one sensor 105, for example. a light sensor, a motor sensor, and another sensor. Specifically, the light sensor includes an ambient light sensor and a proximity sensor. The ambient light sensor may adjust brightness of a display panel 1061 according to ambient light brightness. The proximity sensor may switch off the display panel 1061 and/or backlight when the electronic device 100 moves close to an ear. As a motion sensor, an accelerometer sensor may detect the magnitude of acceleration in various directions (usually three axes), may detect the magnitude and the direction of gravity when being stationary, may be configured to identify a posture of the electronic device (such as switching between a portrait mode and a landscape mode, related games, and magnetometer posture calibration), may perform functions related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein.

The display unit 106 is configured to display information entered by the user or information provided for the user. The display unit 106 may include the display panel 1061, and the display panel 1061 may be configured in a form of a liquid crystal display (Liquid Crystal Display, LCD), an organic light-emitting diode (Organic Light-Emitting Diode, OLED), or the like.

The user input unit 107 may be configured to receive entered number or character information, and generate key signal input related to user settings and function control of the electronic device. Specifically, the user input unit 107 includes a touch panel 1071 and another input device 1072. The touch panel 1071, also referred to as a touch screen, may collect user's touch operations on or near the touch panel 1071 (for example, user's operations on or near the touch panel 1071 with any appropriate object or accessory such as a finger and a stylus). The touch panel 1071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor (including the first control module) 110, and receives and executes a command sent by the processor (including the first control module) 110. In addition, the touch panel 1071 may be implemented by using a plurality of types such as a resistive type, a capacitive type, an infrared ray, and a surface acoustic wave. In addition to the touch panel 1071, the user input unit 107 may further include the another input device 1072. Specifically, the another input device 1072 may include, but is not limited to, a physical keyboard, function keys (such as a volume control key and a switch key), a trackball, a mouse, and a joystick. Details are not described herein.

Further, the touch panel 1071 may cover the display panel 1061. After detecting a touch operation on or near the touch panel 1071, the touch panel 1071 transmits the touch operation to the processor (including the first control module) 110 to determine a type of a touch event. Then, the processor (including the first control module) 110 provides corresponding visual output on the display panel 1061 based on the type of the touch event. Although in FIG. 8, the touch panel 1071 and the display panel 1061 are configured as two independent components to implement input and output functions of the electronic device, in some embodiments, the touch panel 1071 and the display panel 1061 may be integrated to implement the input and output functions of the electronic device. Details are not limited herein.

The interface unit 108 is an interface for connecting an external apparatus and the electronic device 100. For example, the external apparatus may include a wired or wireless headphone port, an external power supply (or a battery charger) port, a wired or wireless data port, a memory card port, a port for connecting to an apparatus having an identification module, an audio input/output (I/O) port, a video I/O port, and an earphone port. The interface unit 108 may be configured to receive input (for example, data information and power) from an external apparatus and transmit the received input to one or more elements in the electronic device 100, or may be configured to transmit data between the electronic device 100 and the external apparatus.

The memory 109 may be configured to store a software program and various data. The memory 109 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 109 may include a high-speed random access memory or a nonvolatile memory, for example, at least one magnetic disk storage device, a flash memory device, or another volatile solid-state storage device.

The processor (including the first control module) 110 is a control center of the electronic device, uses various interfaces and lines to connect various parts of the entire electronic device, and performs various functions of the electronic device and processes data by running or executing software programs and/or modules stored in the memory 109 and invoking data stored in the memory 109, to monitor the electronic device as a whole. The processor (including the first control module) 110 may include one or more processing units. Optionally, the processor (including the first control module) 110 may be integrated with an application processor and a modem processor. The application processor mainly processes an operating system, a user interface, an application program, and the like. The modem processor mainly processes wireless communication. It may be understood that the foregoing modem processor may not be integrated into the processor (including the first control module) 110.

The electronic device 100 may further include a power supply 111 (for example, a battery) that supplies power to various components. Optionally, the power supply 111 may be logically connected to the processor (including the first control module) 110 through a power supply management system, to perform functions such as managing charging, discharging, and power consumption through the power supply management system.

In addition, the electronic device 100 includes some functional modules not shown. Details are not described herein.

Figure 9:
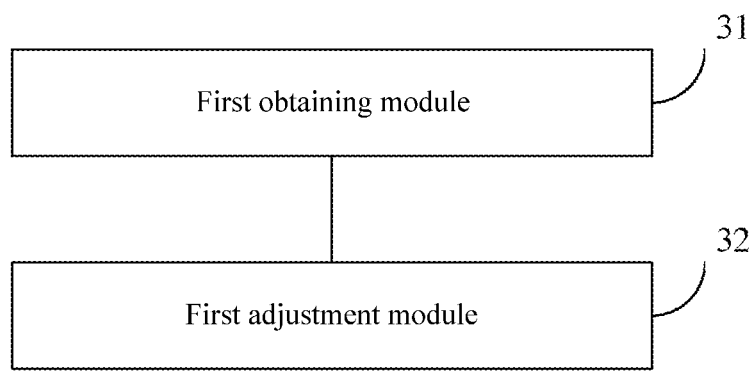
FIG. 9 is a schematic structural diagram of an electronic device according to a fifth embodiment of the present disclosure.

Referring to FIG. 9, FIG. 9 is a schematic structural diagram of an electronic device according to a fifth embodiment of the present disclosure. The electronic device includes:

a first obtaining module 31, configured to obtain a parameter related to strength of magnetic coupling between a receiving coil and a transmitting coil of a wireless charging device; and a first adjustment module 32, configured to control turn-on or turn-off of at least two first switches of a first switch module according to the parameter related to strength of magnetic coupling, to adjust the number of turns of sub-coils that work effectively in the receiving coil.

In this embodiment of the present disclosure, turn-on or turn-off of the at least two first switches of the first switch module is controlled according to the parameter related to strength of magnetic coupling between the receiving coil of the electronic device and the transmitting coil of the wireless charging device, to adjust the number of turns of sub-coils that work effectively in the receiving coil, thereby adjusting the effective impedance of the receiving coil. Therefore, this reduces a temperature rise of the electronic device during charging while ensuring charging efficiency (a charging speed), and can also reduce charging loss.

Specifically, the first adjustment module 32 includes:

a first control unit, configured to: when the parameter related to strength of magnetic coupling indicates that the receiving coil and the transmitting coil are in a strong coupling state, control turn-on or turn-off of the at least two first switches of the first switch module, to reduce the number of turns of sub-coils that work effectively in the receiving coil; and a second control unit, configured to: when the parameter related to strength of magnetic coupling indicates that the receiving coil and the transmitting coil are in a weak coupling state, control turn-on or turn-off of the at least two first switches of the first switch module, to increase the number of turns of sub-coils that work effectively in the receiving coil.

Figure 10:
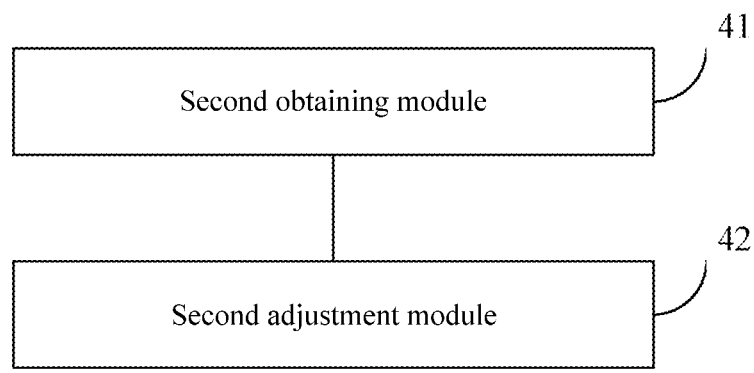
FIG. 10 is a schematic structural diagram of a wireless charging device according to a sixth embodiment of the present disclosure.

Referring to FIG. 10, FIG. 10 is a schematic structural diagram of a wireless charging device according to a sixth embodiment of the present disclosure. The wireless charging device includes:

a second obtaining module 41, configured to obtain a parameter related to strength of magnetic coupling between a transmitting coil and a receiving coil of an electronic device; and a second adjustment module 42, configured to control turn-on or turn-off of at least two second switches of a second switch module according to the parameter related to strength of magnetic coupling, to adjust the number of turns of sub-coils that work effectively in the transmitting coil.

In this embodiment of the present disclosure, turn-on or turn-off of the second switches of the second switch module is controlled according to the parameter related to strength of magnetic coupling between the transmitting coil of the wireless charging device and the receiving coil of the electronic device, to adjust the number of turns of sub-coils that work effectively in the transmitting coil, thereby adjusting the effective impedance of the transmitting coil. Therefore, this reduces a temperature rise of the wireless charging device during charging while ensuring charging efficiency (fast charging), and can also reduce charging loss.

Specifically, the second adjustment module 42 includes:

a third control unit, configured to: when the parameter related to strength of magnetic coupling indicates that the transmitting coil and the receiving coil are in a strong coupling state, control turn-on or turn-off of the at least two second switches of the second switch module, to reduce the number of turns of sub-coils that work effectively in the transmitting coil; or a fourth control unit, configured to: when the parameter related to strength of magnetic coupling indicates that the transmitting coil and the receiving coil are in a weak coupling state, control turn-on or turn-off of the at least two second switches of the second switch module, to increase the number of turns of sub-coils that work effectively in the transmitting coil.

Figure 11:
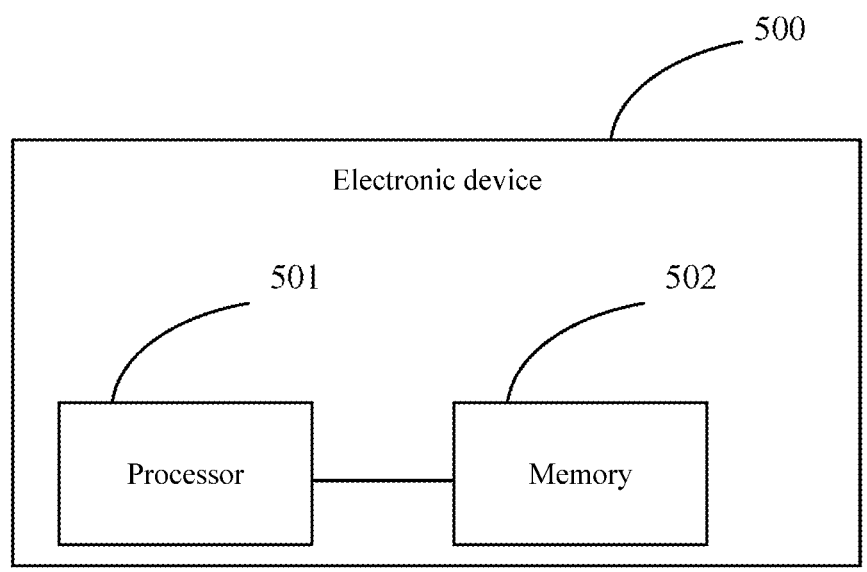
FIG. 11 is a schematic structural diagram of an electronic device according to a seventh embodiment of the present disclosure.

Referring to FIG. 11, FIG. 11 is a schematic structural diagram of an electronic device according to a seventh embodiment of the present disclosure. The electronic device 500 includes: a processor 501, a memory 502, and a computer program stored in the memory 502 and executable on the processor 501. The processor 501 includes a first control module. The computer program, when executed by the processor 501, performs the following steps:

obtaining a parameter related to strength of magnetic coupling between a receiving coil and a transmitting coil of a wireless charging device; and controlling turn-on or turn-off of at least two first switches of a first switch module according to the parameter related to strength of magnetic coupling, to adjust the number of turns of sub-coils that work effectively in the receiving coil.

Alternatively, the computer program, when executed by the processor 501, may further perform the following steps:

when the parameter related to strength of magnetic coupling indicates that the receiving coil and the transmitting coil are in a strong coupling state, controlling turn-on or turn-off of the at least two first switches of the first switch module, to reduce the number of turns of sub-coils that work effectively in the receiving coil; and when the parameter related to strength of magnetic coupling indicates that the receiving coil and the transmitting coil are in a weak coupling state, controlling turn-on or turn-off of the at least two first switches of the first switch module, to increase the number of turns of sub-coils that work effectively in the receiving coil.

Optionally, the parameter related to strength of magnetic coupling includes at least one of the following:

a coefficient of coupling between the receiving coil and the transmitting coil;

a mutual inductance of the receiving coil and the transmitting coil;

relative positions of the receiving coil and the transmitting coil;

an induced electromotive force of the receiving coil;

transmission power; or transmission gains.

The electronic device may perform various processes of the wireless charging method provided in the foregoing third embodiment, and may achieve the same technical effects. To avoid repetition, details are not described herein again.

Figure 12:
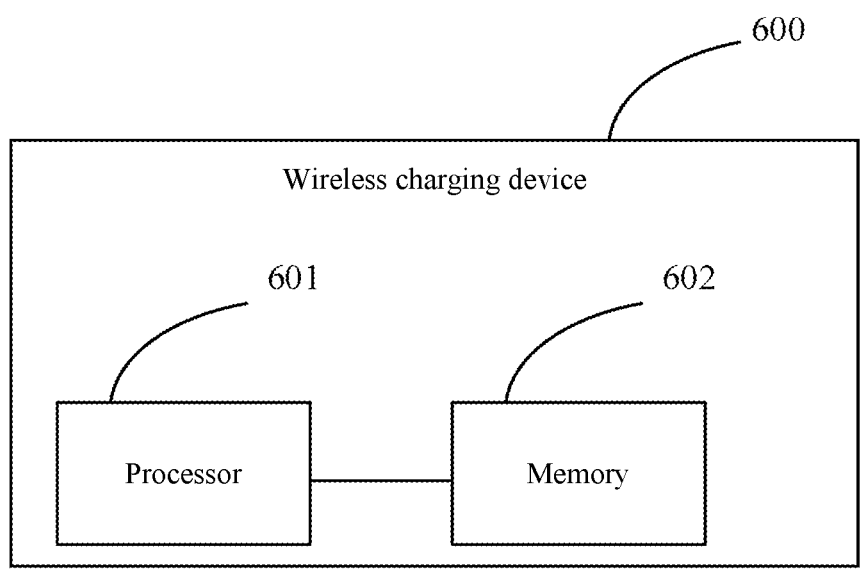
FIG. 12 is a schematic structural diagram of a wireless charging device according to an eighth embodiment of the present disclosure.

Referring to FIG. 12, FIG. 12 is a schematic structural diagram of a wireless charging device according to an eighth embodiment of the present disclosure. The wireless charging device 600 includes: a processor 601, a memory 602, and a computer program stored in the memory 602 and executable on the processor 601. The processor 601 includes a second control module. The computer program, when executed by the processor 601, performs the following steps:

obtaining a parameter related to strength of magnetic coupling between a transmitting coil and a receiving coil of an electronic device; and controlling turn-on or turn-off of at least two second switches of a second switch module according to the parameter related to strength of magnetic coupling, to adjust the number of turns of sub-coils that work effectively in the transmitting coil.

Alternatively, the computer program, when executed by the processor 601, may further perform the following steps:

when the parameter related to strength of magnetic coupling indicates that the transmitting coil and the receiving coil are in a strong coupling state, controlling turn-on or turn-off of the at least two second switches of the second switch module, to reduce the number of turns of sub-coils that work effectively in the transmitting coil; or when the parameter related to strength of magnetic coupling indicates that the transmitting coil and the receiving coil are in a weak coupling state, controlling turn-on or turn-off of the at least two second switches of the second switch module, to increase the number of turns of sub-coils that work effectively in the transmitting coil.

Optionally, the parameter related to strength of magnetic coupling includes at least one of the following:

a coefficient of coupling between the receiving coil and the transmitting coil;

a mutual inductance of the receiving coil and the transmitting coil;

relative positions of the receiving coil and the transmitting coil;

an induced electromotive force of the receiving coil;

transmission power; or transmission gains.

The wireless charging device may perform various processes of the wireless charging method provided in the foregoing fourth embodiment, and may achieve the same technical effects. To avoid repetition, details are not described herein again.

An embodiment of the present disclosure further provides a computer-readable storage medium. The computer-readable storage medium stores a computer program, and when the computer program is executed by a processor, various processes in the embodiments of the foregoing wireless charging methods are implemented, and the same technical effects may be achieved. To avoid repetition, details are not described herein again. The computer-readable storage medium may be a read-only memory (Read-Only Memory, ROM), a random access memory (Random Access Memory, RAM), a magnetic disk, an optical disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. In the absence of more limitations, an element defined by "including a . . . " does not preclude the existence of other identical elements in the process, method, article, or apparatus that includes the element.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. An electronic device, comprising:
a receiving coil, a receiving circuit, a first switch module, and a first control module, wherein
the receiving circuit comprises two access ends;
the receiving coil comprises at least two turns of sub-coils, the receiving coil comprises two lead ends, and one lead end of the receiving coil is connected to one access end of the receiving circuit;
the first switch module comprises at least two first switches, a control end of each first switch is connected to the first control module, a first end of the first switch is connected to one turn of sub-coil of the receiving coil, and a second end of the first switch is connected to the other access end of the receiving circuit; and
the first control module is configured to control turn-on or turn-off of the at least two first switches of the first switch module according to a parameter related to strength of magnetic coupling between the receiving coil and a transmitting coil of a wireless charging device, to adjust the number of turns of sub-coils that work effectively in the receiving coil;
wherein electric power is transmitted from the transmitting coil to the receiving coil by using electromagnetic induction;
wherein the parameter related to strength of magnetic coupling comprises a coefficient of coupling between the receiving coil and the transmitting coil, and the coefficient of coupling between the receiving coil and the transmitting coil is related to the relative positions of the transmitting coil and the receiving coil, when the centers of the transmitting coil and the receiving coil are aligned, it indicates that the receiving coil and the transmitting coil are in a strong coupling state, the first control module is further configured to control turn-on or turn-off of the at least two first switches of the first switch module, to reduce the number of turns of sub-coils that work effectively in the receiving coil.

2. The electronic device according to claim 1, wherein the receiving coil comprises a front coil and a rear coil, the number of turns of sub-coils in the front coil is the same as that in the rear coil, and each turn of sub-coil in the front coil is connected in parallel with a corresponding turn of sub-coil in the rear coil.

3. A wireless charging device, comprising:
a transmitting coil, a transmitting circuit, a second switch module, and a second control module, wherein
the transmitting circuit comprises two access ends;
the transmitting coil comprises at least two turns of sub-coils, the transmitting coil comprises two lead ends, and one lead end of the transmitting coil is connected to one access end of the transmitting circuit;
the second switch module comprises at least two second switches, a control end of each second switch is connected to the second control module, a first end of the second switch is connected to one turn of sub-coil of the transmitting coil, and a second end of the second switch is connected to the other access end of the transmitting circuit; and
the second control module is configured to control turn-on or turn-off of the at least two second switches of the second switch module according to a parameter related to strength of magnetic coupling between the transmitting coil and a receiving coil of an electronic device, to adjust the number of turns of sub-coils that work effectively in the transmitting coil;
wherein electric power is transmitted from the transmitting coil to the receiving coil by using electromagnetic induction;
wherein the parameter related to strength of magnetic coupling comprises a coefficient of coupling between the receiving coil and the transmitting coil, and the coefficient of coupling between the receiving coil and the transmitting coil is related to the relative positions of the transmitting coil and the receiving coil, when the centers of the transmitting coil and the receiving coil are aligned, it indicates that the receiving coil and the transmitting coil are in a strong coupling state, the second control module is further configured to control turn-on or turn-off of the at least two second switches of the second switch module, to reduce the number of turns of sub-coils that work effectively in the transmitting coil.

4. The wireless charging device according to claim 3, wherein the transmitting coil comprises a front coil and a rear coil, the number of turns of sub-coils in the front coil is the same as that in the rear coil, and each turn of sub-coil in the front coil is connected in parallel with a corresponding turn of sub-coil in the rear coil.

5. A wireless charging method, operable by the electronic device according to claim 1, and comprising:
obtaining a parameter related to strength of magnetic coupling between a receiving coil and a transmitting coil of a wireless charging device; and
controlling turn-on or turn-off of at least two first switches of a first switch module according to the parameter related to strength of magnetic coupling, to adjust the number of turns of sub-coils that work effectively in the receiving coil.

6. The wireless charging method according to claim 5, wherein the step of controlling turn-on or turn-off of at least two first switches of a first switch module according to the parameter related to strength of magnetic coupling, to adjust the number of turns of sub-coils that work effectively in the receiving coil comprises:
when the parameter related to strength of magnetic coupling indicates that the receiving coil and the transmitting coil are in a strong coupling state, controlling turn-on or turn-off of the at least two first switches of the first switch module, to reduce the number of turns of sub-coils that work effectively in the receiving coil; and
when the parameter related to strength of magnetic coupling indicates that the receiving coil and the transmitting coil are in a weak coupling state, controlling turn-on or turn-off of the at least two first switches of the first switch module, to increase the number of turns of sub-coils that work effectively in the receiving coil.

7. The wireless charging method according to claim 5, wherein the parameter related to strength of magnetic coupling further comprises at least one of the following:
a mutual inductance of the receiving coil and the transmitting coil;
relative positions of the receiving coil and the transmitting coil;
an induced electromotive force of the receiving coil;
transmission power; or
transmission gains.

8. A wireless charging method, operable by the wireless charging device according to claim 3, and comprising:
obtaining a parameter related to strength of magnetic coupling between a transmitting coil and a receiving coil of an electronic device; and controlling turn-on or turn-off of at least two second switches of a second switch module according to the parameter related to strength of magnetic coupling, to adjust the number of turns of sub-coils that work effectively in the transmitting coil.

9. The wireless charging method according to claim 8, wherein the step of controlling turn-on or turn-off of at least two second switches of a second switch module according to the parameter related to strength of magnetic coupling, to adjust the number of turns of sub-coils that work effectively in the transmitting coil comprises:
   when the parameter related to strength of magnetic coupling indicates that the transmitting coil and the receiving coil are in a strong coupling state, controlling turn-on or turn-off of the at least two second switches of the second switch module, to reduce the number of turns of sub-coils that work effectively in the transmitting coil; or
   when the parameter related to strength of magnetic coupling indicates that the transmitting coil and the receiving coil are in a weak coupling state, controlling turn-on or turn-off of the at least two second switches of the second switch module, to increase the number of turns of sub-coils that work effectively in the transmitting coil.

10. The wireless charging method according to claim 8, wherein the parameter related to strength of magnetic coupling further comprises at least one of the following:
   a mutual inductance of the receiving coil and the transmitting coil;
   relative positions of the receiving coil and the transmitting coil;
   an induced electromotive force of the receiving coil;
   transmission power; or
   transmission gains.

11. An electronic device, comprising: a processor, a memory, and a computer program stored in the memory and executable on the processor, wherein the computer program, when executed by the processor, performs the steps of:
   obtaining a parameter related to strength of magnetic coupling between a receiving coil and a transmitting coil of a wireless charging device; and
   controlling turn-on or turn-off of at least two first switches of a first switch module according to the parameter related to strength of magnetic coupling, to adjust the number of turns of sub-coils that work effectively in the receiving coil;
   wherein electric power is transmitted from the transmitting coil to the receiving coil by using electromagnetic induction;
   wherein the parameter related to strength of magnetic coupling comprises a coefficient of coupling between the receiving coil and the transmitting coil, and the coefficient of coupling between the receiving coil and the transmitting coil is related to the relative positions of the transmitting coil and the receiving coil, when the centers of the transmitting coil and the receiving coil are aligned, it indicates that the receiving coil and the transmitting coil are in a strong coupling state, the computer program, when executed by the processor, further performs the step of:
   controlling turn-on or turn-off of the at least two first switches of the first switch module, to reduce the number of turns of sub-coils that work effectively in the receiving coil.

12. The electronic device according to claim 11, wherein the processor is configured to,
   when the parameter related to strength of magnetic coupling indicates that the receiving coil and the transmitting coil are in a strong coupling state, control turn-on or turn-off of the at least two first switches of the first switch module, to reduce the number of turns of sub-coils that work effectively in the receiving coil; and
   when the parameter related to strength of magnetic coupling indicates that the receiving coil and the transmitting coil are in a weak coupling state, control turn-on or turn-off of the at least two first switches of the first switch module, to increase the number of turns of sub-coils that work effectively in the receiving coil.

13. The electronic device according to claim 11, wherein the parameter related to strength of magnetic coupling further comprises at least one of the following:
   a mutual inductance of the receiving coil and the transmitting coil;
   relative positions of the receiving coil and the transmitting coil;
   an induced electromotive force of the receiving coil;
   transmission power; or
   transmission gains.

14. A non-transitory computer-readable storage medium, wherein the computer-readable storage medium stores a computer program, and the computer program, when executed by a processor, performs the wireless charging method according to claim 5.

15. A non-transitory computer-readable storage medium, wherein the computer-readable storage medium stores a computer program, and the computer program, when executed
   by a processor, performs the wireless charging method according to claim 8.

\* \* \* \* \*